United States Patent
Vutetakis et al.

[11] Patent Number: 6,153,335
[45] Date of Patent: Nov. 28, 2000

[54] BATTERY CELL CONSTRUCTION INCLUDING FIBEROUS MAT SEPARATOR

[75] Inventors: David G. Vutetakis, High Point; Christopher R. Cestone, Winston-Salem; Stanley K. Wilkie, Lexington, all of N.C.

[73] Assignee: Douglas Battery Manufacturing Company, Winston-Salem, N.C.

[21] Appl. No.: 09/161,027

[22] Filed: Sep. 25, 1998

[51] Int. Cl.[7] .................................................. H01M 4/56
[52] U.S. Cl. .......................... 429/225; 429/131; 429/136
[58] Field of Search .................................. 429/129, 131, 429/132, 135, 136, 137, 225

[56] References Cited

U.S. PATENT DOCUMENTS

| | | |
|---|---|---|
| Re. 23,644 | 4/1953 | Grant . |
| 2,594,711 | 4/1952 | Andre ......................................... 429/94 |
| 2,956,100 | 10/1960 | Mendelsohn et al. . |
| 4,029,855 | 6/1977 | Dougherty et al. . |
| 4,114,260 | 9/1978 | DiGiacomo et al. . |
| 4,216,280 | 8/1980 | Kono et al. . |
| 4,383,011 | 5/1983 | McClelland et al. . |
| 4,396,691 | 8/1983 | Wheadon ................................. 429/136 |
| 4,425,412 | 1/1984 | Dittmann et al. . |
| 4,525,438 | 6/1985 | Pearson . |
| 4,525,926 | 7/1985 | Pearson . |
| 4,546,053 | 10/1985 | Sundberg . |
| 4,587,181 | 5/1986 | Gibson et al. . |
| 4,618,545 | 10/1986 | Clegg et al. . |
| 4,652,505 | 3/1987 | Komaki et al. . |
| 4,663,253 | 5/1987 | Simonton et al. ....................... 429/129 |
| 4,713,304 | 12/1987 | Rao et al. . |
| 4,743,270 | 5/1988 | McCartney, Jr. et al. . |
| 4,780,379 | 10/1988 | Puester . |
| 4,788,113 | 11/1988 | Bohle et al. . |
| 4,859,710 | 8/1989 | Ohmae et al. . |
| 5,075,184 | 12/1991 | Tanaka et al. . |
| 5,091,275 | 2/1992 | Brecht et al. . |
| 5,116,698 | 5/1992 | Sears ......................................... 429/94 |
| 5,250,372 | 10/1993 | Willmann et al. . |
| 5,336,275 | 8/1994 | Zguris et al. . |
| 5,376,477 | 12/1994 | Aidman et al. . |
| 5,384,211 | 1/1995 | Choi et al. . |
| 5,401,279 | 3/1995 | Eisenhut et al. . |
| 5,441,123 | 8/1995 | Beckley et al. . |
| 5,468,572 | 11/1995 | Zguris et al. . |
| 5,512,065 | 4/1996 | Kump et al. . |
| 5,593,796 | 1/1997 | Misra et al. . |
| 5,635,312 | 6/1997 | Yanagisawa et al. . |
| 5,731,099 | 3/1998 | Badger et al. . |

OTHER PUBLICATIONS

Lead/Acid Recombination Batteries: Principles and Applications; N.E. Gagshaw; Journal of Power Sources, 31 (1990); pp. 23–33, no month available.

History of Valve Regulated Lead Acid Batteries in the United States; I.C. Bearinger, The Battery Man; Dec., 1992; pp. 30–35.

Hardigg Has Battery Jars Covered. Permanently; advertisement brochure; believed to be prior art.

Hollingsworth & Vose Company Training Manual, date believed to be as early as Apr. 1997.

*Primary Examiner*—Maria Nuzzolillo
*Assistant Examiner*—Monique Wills
*Attorney, Agent, or Firm*—Rhodes, Coats & Bennett, L.L.P.

[57] ABSTRACT

The present invention relates to a lead-acid battery cell construction including a container; a plurality of positive plates positioned in the container; and a plurality of negative plates arranged in alternating order with the positive plates. A plurality of separators are provided with the plate separators being wrapped around the positive or the negative plates such that the vertical side walls of the wrapped plates are covered with at least a single layer of separator material.

11 Claims, 3 Drawing Sheets

BATTERY CELL CONSTRUCTION INCLUDING FIBROUS MAT SEPARATOR

FIELD OF THE INVENTION

The present invention relates to the internal configuration of valve regulated lead-acid (VRLA) batteries. More particularly, the invention relates to the makeup of the plate separators used in VRLA battery cells.

BACKGROUND OF THE INVENTION

Lead-acid recombination batteries offer a number of advantages compared to flooded cell batteries. Flooded lead-acid batteries are designed to have an excess of electrolyte that floods the cell container, completely saturating the plate group and extending into the head space above the plate group to provide a reservoir. The electrolyte reservoir is necessary because as the battery is charged, water in the electrolyte is electrolyzed into oxygen and hydrogen gases, which escape from the cell and deplete the electrolyte volume. To make up for the loss of electrolyte, water must be periodically re-introduced into the cell, or the reservoir must be made large enough to compensate for the expected loss over the life of the battery. Thus, there is a certain minimum amount of maintenance required for flooded cell batteries.

Recently, valve-regulated lead-acid (VRLA) recombinant batteries have been introduced that are suitable for, among other things, deep discharge applications. The electrolyte in VRLA batteries is absorbed in separators positioned between the positive and negative plates. VRLA batteries rely upon internal gas recombination to minimize electrolyte loss over the life of the battery, thereby eliminating the need for re-watering. Internal gas recombination is achieved by allowing oxygen generated at the positive electrode to diffuse to the negative electrode, where it recombines to form water and also suppresses the evolution of hydrogen. The diffusion of oxygen is facilitated by providing a matrix that has electrolyte-free pathways. The recombination process is further enhanced by sealing the cell with a mechanical valve to keep the oxygen from escaping so it has greater opportunity for recombination. The valve is designed to regulate the pressure of the cell at a predetermined level, hence the term, "valve-regulated".

There are two commercially available technologies for achieving the enhanced oxygen diffusion. One technology makes use of a gelled electrolyte. In gel technology, the electrolyte is immobilized by introducing a gelling agent such as fumed silica. Gas channels form in the gel matrix in the early stages of the cell's life as water is lost via electrolysis. Once the gas channels are formed, further water loss is minimized by the recombination process. Unlike the AGM matrix, the gel matrix keeps the electrolyte immobilized and there is little bulk movement.

The other technology for enhancing oxygen diffusion makes use of a fibrous mat material (FMM) separator between the electrodes. A widely used FMM for this purpose is an absorbed glass mat (AGM). The AGM is a non-woven fabric comprised of glass micro-fibers that retain the electrolyte by capillary action, but also provide gas spaces as long as the matrix is not fully saturated with electrolyte. The electrolyte is still free to move within the matrix, but is more confined than in a flooded cell. Another fibrous material gaining acceptance is a non-woven mat constructed from a polymeric component such as polypropylene or polyethylene.

The performance of VRLA batteries using FMM separators may be degraded over time for several reasons. These include short circuits between battery cell plates. The short circuits can occur along exposed plate side walls and also by dendritic short circuits between plate surfaces. This problem is exacerbated if the edges of the fibrous mat separator material are not aligned in close registration with the edges of the plate. Misalignment can occur during battery manufacture as the plate-fibrous material combination is inserted into temporary containers called "burning boxes" for casting of internal plate straps. This procedure is described in U.S. Pat. No. 4,114,260 to DiGiacomo et al., the content of which is incorporated herein by reference. This problem has been addressed in the past by providing reinforcing straps and films to hold plates and fibrous material in registration. This approach is expensive and requires additional manufacturing steps.

These problems and the advantages of the present invention will be better appreciated with an understanding of the previously used approach for installing fibrous separator material such as an AGM between plates of a VRLA battery cell. FIG. 1 is a schematic representation of a typical VRLA battery cell plate 20. In this instance, the plate has a generally rectangular shape and includes a lug 22 which is connected electrically to a battery terminal using some type of cast strap (not shown). The plate also includes vertical side walls 20a, 20b and a bottom edge 20c. The plate further includes opposing flat faces.

The AGM material has been wrapped around the plate as shown in FIG. 2. A sheet of AGM material 26 is wrapped around the bottom edge 20c of the plate 20 and extends upwardly along the opposing plate faces towards the top of the plate. This approach leaves both vertical side walls 20a, 20b exposed and more susceptible to plate-to-plate short circuits. Moreover, it will be readily appreciated that this wrapping technique leaves two exposed, loose edges of AGM material that may be difficult to keep aligned with the plate itself during assembly of the battery cell. The assembly of the battery cells for some applications is accomplished by hand. This is particularly true for cells used for motive power applications. Maintaining the proper alignment between the plates 20 and the AGM material 26 is difficult as the plate-AGM combination goes through a series of battery cell manufacturing steps. This problem has been addressed in the past by incorporating some type of sheath or restraining means surrounding the AGM material. The resulting extra cost and additional manufacturing steps are disadvantageous.

There is a need then for a method of installing fibrous mat separators in VRLA battery cells so as to minimize plate-to-plate short circuits and to ensure alignment between the separators and the plates. The present invention addresses this and other needs. Further, the present invention provides additional advantages and solutions to additional problems not necessarily stated herein. The scope of the present invention includes those advantages and solutions to these additional problems.

SUMMARY OF THE INVENTION

The present invention provides several advantages for the construction of VRLA battery cells. The invention provides increased electrolyte carrying capacity so as to increase battery capacity and life. The invention advantageously reduces the amount of plate-separator misalignment that can occur during battery cell manufacture. It is believed that correcting the alignment problem will reduce substantially short circuits that can shorten battery cell life.

The present invention relates to a lead-acid battery cell construction that includes a container; a set of positive plates positioned in the container each of the positive plates having vertical side walls; and a set of negative plates arranged in alternating order with the positive plates. Each of the negative plates and the positive plates have opposing vertical side walls. In accordance with the broadest aspects of the present invention, the plate separators are wrapped completely around the positive or the negative plates such that the vertical side walls of the wrapped plates are covered with at least a single layer of separator material.

In a preferred embodiment each plate separator includes first and second sheets of fibrous material each having an exposed vertical side edge and a wrapped vertical side edge. The sheets are wrapped around the plates such that the wrapped vertical side edge of the first sheet underlays the second sheet and the wrapped vertical edge of the second sheet underlays the first sheet.

In an alternative embodiment, the first sheet is wrapped around a first vertical side wall of the plate and second sheet is wrapped around an opposing second vertical side wall of the plate. The second sheet overlays the first sheet such that the first sheet vertical side edges are covered by the second sheet. The second sheet's vertical side edges are exposed.

In yet another alternative embodiment each plate separator is comprised of a single continuous sheet of fibrous material having two vertical side edges. The material is wrapped around the wrapped plates such that one of the side edges is substantially covered by the wrapped material and a single side edge is exposed.

The invention further relates to a method for installing a fibrous separator between alternating positive and negative plates of a lead-acid battery cell. The method includes aligning a first vertical edge of a single continuous sheet of fibrous separator material in substantial registration with a vertical side wall of each of the positive plates or the negative plates and wrapping the continuous sheet of fibrous separator material around the plates so as to create a pair of inner layers of separator material on opposing sides of the plate. Then the continuous sheet of fibrous separator is wrapped around the pair of inner layers so as to form a pair of outer layers of separator material overlaying the inner layers. When the wrapping is complete a second vertical edge of the continuous sheet of fibrous separator material is in substantial registration with the vertical side wall of the plate.

The invention further relates to a method for installing a fibrous separator between alternating positive and negative plates of a valve regulated lead acid battery cell. The method includes placing a first sheet of fibrous mat material atop a second sheet of fibrous material so that the sheets are in vertical and horizontal registration. The first and second sheets have substantially the same dimension and have opposing first and second vertical side edges. A flat battery cell plate having first and second opposing vertical side walls is placed atop the two sheets such that one of the side walls is aligned with the first vertical side edge of the first sheet. The second side edge of the first sheet is pulled across the plate so that the first and second vertical side edges of the first sheet are substantially in alignment with the plate first side wall. The opposing second side wall of the plate is then covered with a wrap of the sheet material and the first side wall of the plate is exposed. Next, the plate is slid across the bottom sheet such that the plate second side wall is in substantial vertical alignment with the second vertical side edge of the second sheet. Then the first vertical side edge of the second sheet is pulled across the plate and underneath the portion of the first top sheet covering the top of the plate.

Accordingly, it is an object of the present invention to decrease the amount of plate-to-plate short circuits that occur during the life of a VRLA battery.

Still another object of the present invention is to improve the reliability of VRLA batteries by, among other things, creating a high degree of consistency between plates in a high volume manufacturing process.

Yet another object of the present invention is to achieve the above-stated object while reducing the manufacturing costs of VRLA batteries.

These and other advantages, objects and aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate multiple embodiments of the invention and, together with the description, serve to explain the principles of the invention.

BRIEF DESCRIPTION OF THE DRAWINGS

The above and other objects, features, and advantages of the present invention will become more apparent and will be readily appreciated from the following detailed description of the preferred embodiments of the invention taken in conjunction with the accompanying drawings, in which.

DETAILED DESCRIPTION OF THE PREFERRED EMBODIMENT

Figure 3:
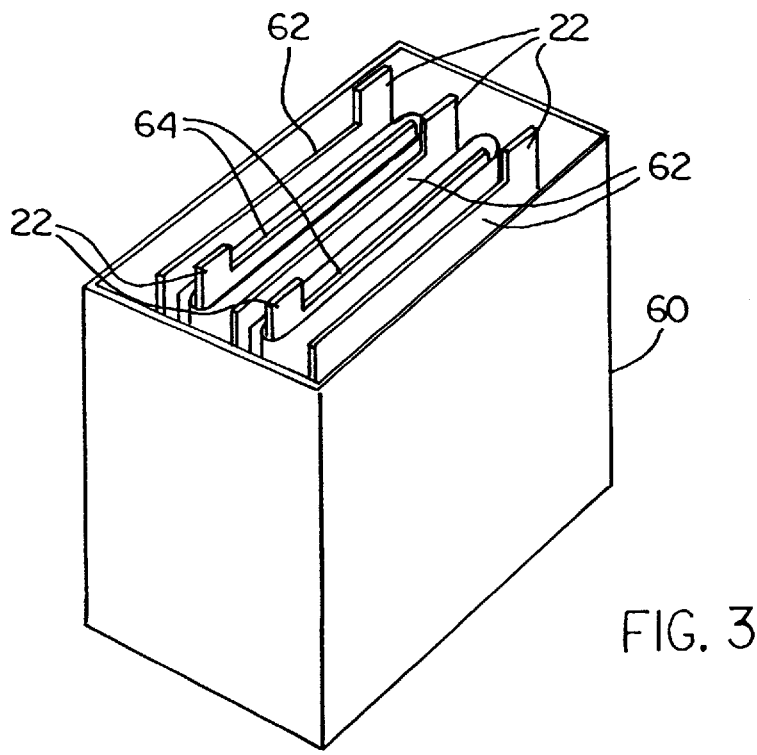
FIG. 3 is an isometric view of a battery cell container holding alternating positive and negative plates therein.

Turning now to FIG. 3, there is illustrated a cell according to a preferred embodiment of the present invention. The cell is comprised of a container 60, sometimes referred to in the art as a "jar," which holds at least one flat negative plate 62 and at least one flat positive plate 64. In this embodiment there are two positive plates 64 and three negative plates 62. As was discussed above, each plate contains a lug 22 for connection to a cell terminal. The cell cover and terminals are not shown in this view for clarity and to illustrate the internals of the cell. The plates 62, 64 are constructed according to conventional plate-making technology. It will be readily appreciated that the lugs 22 of the negative plates 62 and the positive plates 64 have been aligned with each other. Given the alternating positive-negative plate arrangement, lugs for the negative plates 62 are in registration on one side of container 60 and the lugs for the positive plates 64 are in registration on an opposite side of container 60.

Figure 4:
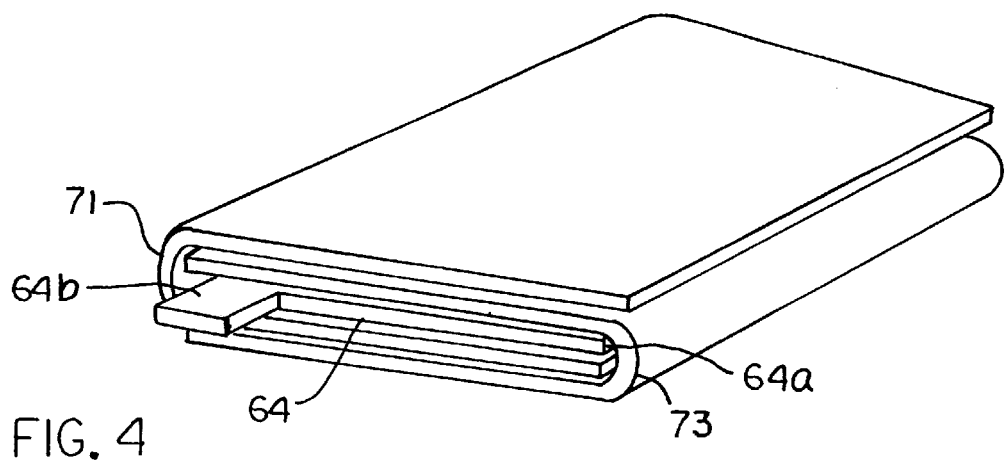
FIG. 4 is an isometric view of a battery cell plate wrapped according to a preferred embodiment of the present invention.
Figure 5:
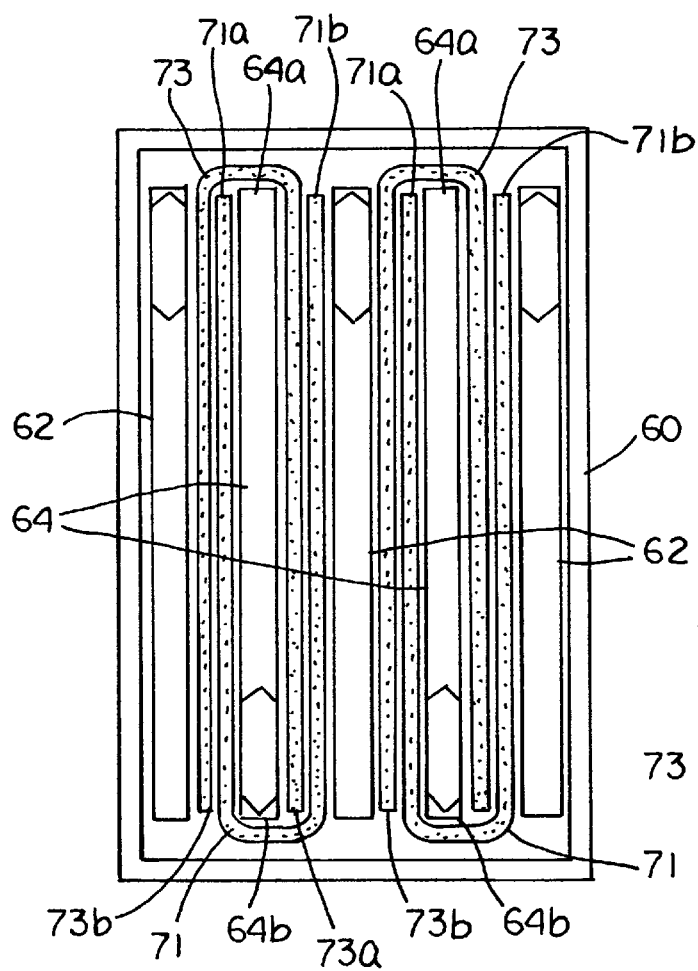
FIG. 5 is a top view of the battery cell shown in FIG. 3.

Turning now to FIG. 5 there is illustrated a top view of battery cell container 60. An isometric view of a wrapped positive plate is depicted in FIG. 4. As described above, the container 60 includes 3 negative plates 62 and 2 positive plates 64. Typically, the number of negative plates 62 is one more than the number of positive plates 64 and the alternating arrangement of plates begins and ends with negative plates 62. The positive plates have been wrapped with a fibrous separator comprising an interleaving, offset "C-wrap." The separator includes a first sheet 71 and a second sheet 73 each having one wrapped side edge 71*a*, 73*a* and one exposed vertical side edge 71*b*, 73*b*. It will be readily appreciated that the first sheet wrapped side edge 71*a* and the second sheet wrapped side edge 73*a* underlay the second and first sheets 73, 71 respectively. The two exposed side edges 71*b*, 73*b* do not present an alignment problem because each sheet 71, 73 has a side edge that is tucked under a wrapped layer and thus held in place and in proper alignment with the plates 64. This arrangement provides a layer of fibrous mat material surrounding each of the plate edges 64*a*, 64*b*. Further, two layers of fibrous mat material are provided between each positive plate 64 and the adjacent negative plate 62.

The method for wrapping a battery cell plate according to this embodiment includes first placing a first sheet of fibrous material atop a second sheet of fibrous material such that the sheet are in vertical and horizontal registration. The sheets have substantially the same dimension and include first (right) and second (left) vertical side edges. The width of the sheet should be selected to be slightly greater than twice the width of the plate to be wrapped. By way of non-limiting example, for a plate having a width of about 5.625 inches, a sheet having a width of about 12.0 inches may be used. As discussed above, the plate has opposing first (right) and second (left) vertical side walls.

Next, the plate is placed atop the two sheets with the right side wall of the plate aligned with the right vertical side edges of the two sheets. Next, the left edge of the top sheet is pulled across the top of the plate so that the vertical side edges of the sheet are substantially in alignment with the right side wall of the plate. It will be appreciated that at this point the left side wall of the plate is covered with a wrap of the sheet material and that the right side wall of the plate is exposed. The once-wrapped plate is then slid across the bottom sheet such that the wrapped left plate side wall is in substantial vertical alignment with the left vertical side edge of the bottom sheet. The right edge of the bottom sheet is then picked up and pulled across the plate underneath the portion of the top sheet covering the top of the plate. In order to accomplish this step, it may be necessary to lift the upper folder portion of the top sheet so that the folded portion of the bottom sheet may be inserted thereunder. Generally, this embodiment provides a more robust cell assembly.

The advantages of this plate wrapping technique include the use of a smaller sheet of FMM to wrap the plate. It has been found that a larger sheet may sometimes present handling challenges for assembly line fabricators. Another advantage stems from the use of equal-sized sheets of FMM. This reduces manufacturing costs because only one size of sheet material need be inventoried. It has been found that this embodiment is better adapted for hand assembly of the cells even though it includes two exposed vertical side edges of fibrous mat sheet material. The exposed edges are not problematic because one side edge of each sheet is locked in place under a wrap formed by the other sheet.

Figure 6:
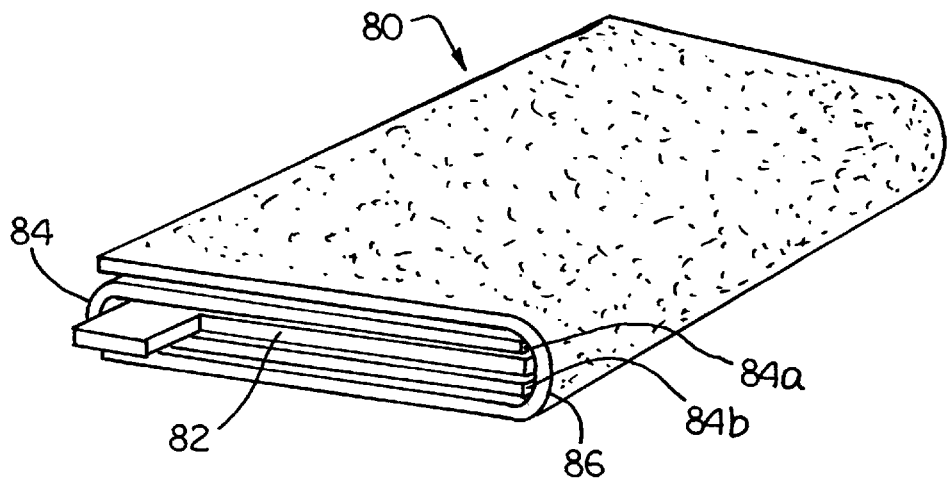
FIG. 6 is an isometric view of a battery cell plate wrapped according to an alternative embodiment of the present invention.

It will be readily appreciated that with a slight modification to the procedure described above the two sheets of fibrous mat material could be folded such that one of the two sheets would envelop the other as illustrated in FIG. 6. This alternative embodiment 80 includes a flat plate 82 which is wrapped with an inner sheet 84 and is then over wrapped with an outer sheet 86. This embodiment, though functional, is not as preferred because the outer sheet 86 must have a greater length than the inner sheet 84 because it must wrap both the plate 82 and the inner sheet 84. Accordingly, two different sizes of fibrous mat material must be inventoried thus increasing manufacturing costs. Moreover, it is believed that the vertical side edges 84*a*, 84*b* of the inner sheet 84 will not lay flat against the plate 82.

Figure 7:
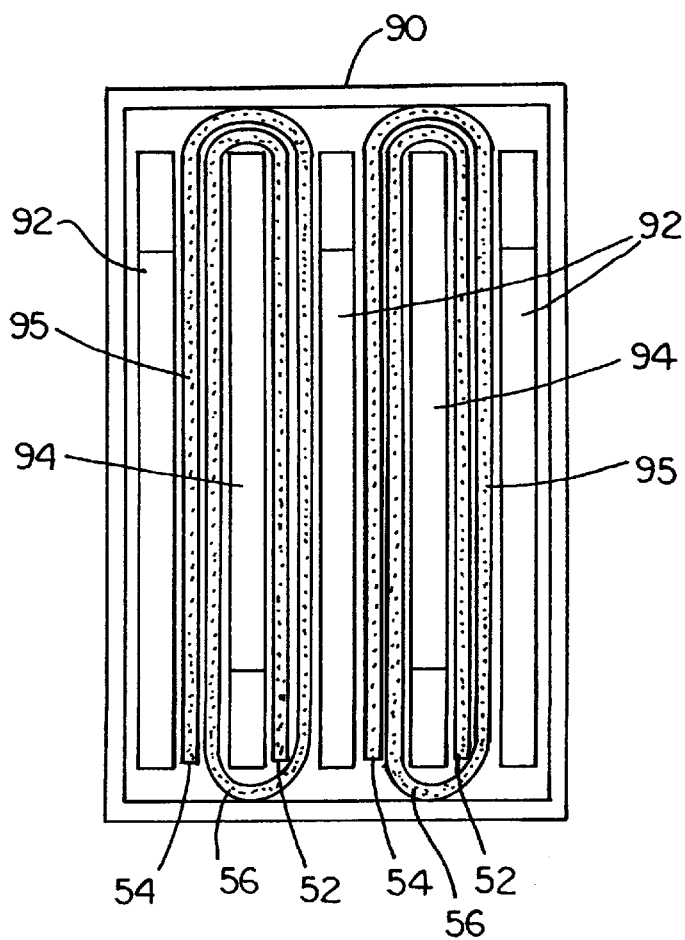
FIG. 7 is a top view of the battery cell constructed according to an alternative embodiment of the present invention.

Another alternative embodiment is illustrated in FIG. 7 which is a top view looking down into a container 90. The positive plates 94 are wrapped with a single continuous sheet of AGM material 95. The AGM material 95 is wrapped around each positive plate 94 so as to provide two layers of AGM material on each side of the plate 94 for a total of four layers. These four layers include a pair of inner layers directly adjacent to the plate opposing sides and a pair of outer layers overlaying the inner layers. The pair of inner layers and the pair of outer layers are joined in continuous fashion by a U-shaped section 56 of AGM material.

This continuous wrap is accomplished by aligning the first vertical edge 52 of the continuous sheet 95 substantially in registration with a vertical side wall of the plate 94. Next, the AGM sheet 95 is wrapped a first time around the vertical height dimension of the plate 94 to create the pair of inner layers of separator material on opposing sides of the plate 94. Then the AGM sheet 95 is wrapped a second time to create a pair of outer layers overlaying the inner layers such that the second vertical edge 54 of the continuous sheet 95 of separator material is substantially aligned with the vertical side wall of the plate 94. It will be appreciated that because a continuous sheet of AGM material is used to create all four layers, there is no discrete transition between layers. The inner layers are joined to the outer layers by U-shaped portion 56.

When wrapped about a plate 94 according to this alternative embodiment, one of the two vertical edges of the AGM sheet 95 will be covered by the wrapped material leaving a single vertical edge 54 exposed. The covered vertical edge 52 is held in place securely by the outer wrap of AGM material. Having been so locked in place, this vertical edge 52 does not present a handling or alignment problem.

Any suitable fibrous mat material may be used in the practice of the present invention and can be selected according to the cell's proposed use by one of ordinary skill. A typical AGM material suitable for use in the present invention is the HOVOSORB® 65 Series available from Hollingsworth & Vose Company. This product is a 100% microglass separator with a surface area of 1.25 $m^2$/g. It is available in standard thicknesses ranging from about 1.07 mm to about 3.02 mm. Other AGM materials may be used and their selection is within the capability of one of ordinary skill.

Other types of non-glass separator mats may also be used in the practice of the present invention. A non-limiting example is the POLYPORE® VRLA separator material available from Daramic, Inc. This separator is constructed from a polymeric material such as polypropylene. The POLYPORE® material has good wetting characteristics and fine fiber diameter. Thus, it offers high porosity in combination with high tensile strength. The practice of the present invention includes the use of other types of non-glass fibers for this function provided they meet the performance characteristics stated herein. By way of non-limiting example non-woven fibrous mats constructed from polyethylene may be used.

It should be understood that FIG. 3 discussed above shows a partially-assembled battery cell. The container 60, plates 62, 64, and the fibrous material sheets 71, 73 (FIG. 5) typically are positioned vertically during assembly of the cell components. It will be readily appreciated that when the cell is put into service it may have a horizontal orientation (See FIGS. 4 and 6) so that the "vertical" side edges will lie horizontally as the battery is discharged. Thus any references herein to a vertical side edge or side wall do not limit the end application of a cell constructed according to the present invention. Battery cells constructed according to the present invention may be used in the vertical position so long as the height of the plates and separators is not so great as to create an electrolyte stratification problem.

It should be understood further that although described herein to show the separator material wrapped around the positive plate, the invention also applies to wrapping of the negative plate. Alternatively, there may be designs in which both the positive and negative plates are wrapped. Either of these alternatives are desirable so long as a proper amount of separator material is provided between plates.

The present invention offers many advantages for makers of VRLA batteries. The preferred embodiment shown in FIGS. 3–5 is less susceptible to wrinkling of the wrapped vertical side edges as the FMM is wrapped around the plate. It has been found that the assembly steps described above ensure that each layer of separator material is laid flat against the plates without bunching or wrinkling. Another advantage of the preferred embodiment lies in the fact that it is less susceptible to dimensional variations in the sheets of FMM material. That is, if the two sheets used to wrap the plate are not exactly the same size, then a small size difference may be compensated for during wrapping. It will be readily appreciated that for the embodiment depicted in FIG. 6, any extra length of the inner sheet 84 will cause bunching and/or wrinkling to take place within the U-shaped portion of the outer sheet 86.

Figure 1:
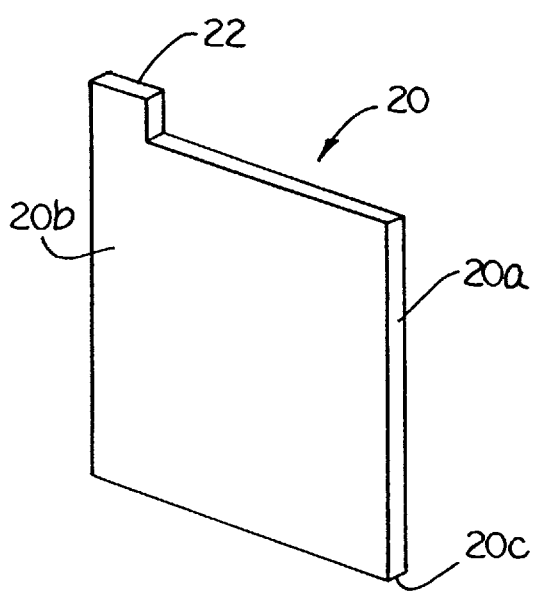
FIG. 1 is an isometric view of a plate used in a VRLA battery.
Figure 2:
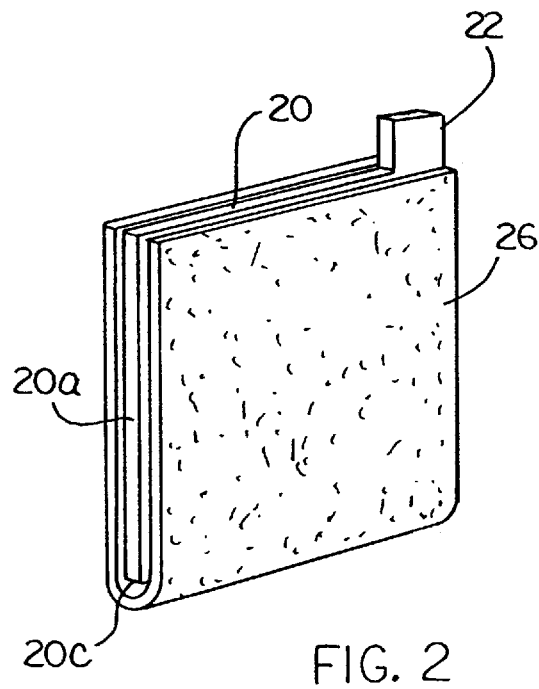
FIG. 2 is an isometric view of the plate depicted in FIG. 1 showing the "U-wrap" method of wrapping a sheet of fibrous separator material around the plate.

One advantage of the opposed "C-wrap" and continuous wrap embodiments is the provision of an extra portion 56 (FIG. 7) of electrolyte-carrying fibrous material as compared to the "U-wrap" described above (FIG. 2). As will be readily appreciated by those of ordinary skill in the art, any opportunity to increase the amount of electrolyte carried in a given container 30 provides battery performance and battery life improvements. Designers of VRLA batteries strive to store as much electrolyte as possible in the cells.

The present invention further provides other advantages and solutions to other problems as will be readily apparent to one of ordinary skill. The scope of the present invention includes these advantages and solutions.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What We claim is:

1. A lead-acid battery cell construction comprising:
   a. a container;
   b. a set of positive plates positioned in the container each of the positive plates having vertical side walls;
   c. a set of negative plates arranged in alternating order with the positive plates, each of the negative plates having vertical side walls; and
   d. plate separators wrapped around the positive or the negative plates such that the vertical side walls of the wrapped plates are covered with at least a single layer of separator material
   wherein each plate separator comprises first and second sheets of fibrous material each of the sheets having an exposed vertical side edge and a wrapped vertical side edge wherein the wrapped vertical side edge of the first sheet underlays the second sheet and the wrapped vertical edge of the second sheet underlays the first sheet.

2. A lead-acid battery cell construction according to claim 1 wherein each plate separator comprises a single continuous sheet of fibrous material having two side edges wherein the material is wrapped around the wrapped plates such that one of the side edges is substantially covered by the wrapped material and a single side edge is exposed.

3. A lead-acid battery cell according to claim 1 wherein the separator is comprised of a non-woven fibrous glass fabric.

4. A lead-acid battery cell according to claim 1 wherein the separator is comprised of non-woven fibrous polymeric fabric.

5. A plate separator for separating flat plates in a valve regulated lead acid battery cell comprising:
   a. a first sheet having an exposed vertical side edge and a wrapped vertical side edge;
   b. a second sheet having an exposed vertical side edge and a wrapped vertical side edge, wherein the first and second sheets are wrapped around a flat battery cell plate such that the wrapped vertical side edge of the first sheet underlays the second sheet and the wrapped vertical edge of the second sheet underlays the first sheet.

6. A lead-acid battery cell according to claim 5 wherein the separator is comprised of a non-woven fibrous glass fabric.

7. A lead-acid battery cell according to claim 5 wherein the separator is comprised of non-woven fibrous polymeric fabric.

8. A plate separator for a valve regulated lead acid battery cell comprising a single continuous sheet of fibrous material wherein the material is wrapped around the plate such that two layers of material are provided on one side of the plate and two layers of material are provided on an opposing side of the plate each of the layers connected by a U-shaped section of material.

9. A valve regulated lead acid battery cell plate separator for a plate having opposing flat faces comprising a single continuous sheet of fibrous material so wrapped around the plate as to define a pair of inner layers of material directly adjacent the opposing flat faces and a pair of outer layers overlaying the inner layers wherein the inner layers and the outer layers are joined by a U-shaped portion of material.

10. A method for installing a fibrous separator between alternating positive and negative plates of a valve regulated lead acid battery cell comprising:
   a. aligning a first vertical edge of a single continuous sheet of fibrous separator material in substantial registration with a vertical side wall of a positive plate or a negative plate;

b. wrapping the continuous sheet of fibrous separator material around the plate so as to create a pair of inner layers of separator material on opposing sides of the plate;

c. wrapping the continuous sheet of fibrous separator material around the pair of inner layers so as to form a pair of outer layers of separator material overlaying the inner layers, wherein a second vertical edge of the continuous sheet of fibrous separator material is in substantial registration with the vertical side wall of the plate; and d. repeating steps a through c for each of the positive or negative plates wherein the positive or negative plates not wrapped remain unwrapped.

11. A method for installing a fibrous separator between alternating positive and negative plates of a valve regulated lead acid battery cell comprising:

a. placing a first sheet of fibrous mat material atop a second sheet of fibrous material such that the sheets are in vertical and horizontal registration wherein the first and second sheets have substantially the same dimension, the sheets having opposing first and second vertical side edges;

b. placing a flat battery cell plate having first and second opposing vertical side walls atop the two sheets such that one of the side walls is aligned with the first vertical side edge of the first sheet;

c. pulling the second side edge of the first sheet across the plate so that the first and second vertical side edges of the first sheet are substantially in alignment with the plate first side wall and the opposing second side wall of the plate is covered with a wrap of the sheet material and the first side wall of the plate is exposed;

d. sliding the plate across the bottom sheet such that the plate second side wall is in substantial vertical alignment with the second vertical side edge of the second sheet; and e. pulling the first vertical side edge of the second sheet across the plate and underneath the portion of the first top sheet covering the top of the plate.

* * * * *